3,007,828
SYNTHETIC LAMINATE
William M. Boyer, Country Club Hills, Gilbert Gavlin, Lincolnwood, and Harlan E. Tarbell, Jr., Elmhurst, Ill., assignors to The Richardson Company, Melrose Park, Ill., a corporation of Ohio
No Drawing. Filed Sept. 2, 1958, Ser. No. 758,554
6 Claims. (Cl. 154—43)

This invention is concerned with synthetic industrial laminates derived from resin impregnated fillers and, more particularly, to synthetic laminates having improved electrical and physical properties.

Synthetic laminates have gained wide acceptance in the electrical industry as insulation media and as a support for electrical components of a circuit. Such laminates are customarily made by initially impregnating a filler sheet with a thermosetting synthetic resin, partially curing the resin, superimposing a plurality of the impregnated sheets to form a build-up and subjecting the build-up to heat and pressure to finally cure the resin and consolidate the assembly into a hard board-like product. Filler sheets used in forming laminates are made from both naturally occurring fibers, such as cellulose fibers obtained from cotton, and synthetic fibers obtained by spinning synthetic polymers or melted inorganic materials like glass.

One of the most common fillers used in the manufacture of laminates is paper due to the fact that it is relatively inexpensive and offers properties in the finished laminate which, on the average, are satisfactory for normal use. To obtain a higher grade of properties, it is customary to use somewhat more expensive fillers, for example, fabrics made from synthetic fibers. Continued developments are under way to up grade laminates made from paper as the filler, whereby the properties of such laminates will more closely approach those properties of laminates made from fillers derived from the aforementioned synthetic fibers.

Accordingly, it is one of the principal objects of this invention to improve the electrical and physical properties of synthetic laminates made from cellulosic fillers and, particularly, paper.

Another object is the provision of new resin compositions which may be used to manufacture cellulose-base laminates having improved properties.

These and other objects will become more apparent from the following detailed disclosure of the invention.

As indicated, synthetic laminates are made by impregnating a filler with a thermosetting resin and, subsequently, consolidating a plurality of impregnated filler sheets by heat and pressure. One class of resins generally employed for this purpose is phenolic resoles formed by condensing, in an alkali medium, such phenolic materials as phenol, resols, xylenols or mixtures thereof with an aldehyde, such as formaldehyde. Resoles are to be distinguished from permanently fusible phenolic resins, sometimes referred to as novolaks, which are made by condensing equal or greater molar proportions of phenol, for example, with an aldehyde in the presence of an acid catalyst. For specialized applications, the newer epoxy resins have been used, particularly in forming laminates from filler sheets made of glass fibers. A typical epoxy resin is that formed by condensing a bisphenol with epichlorohydrin, an example being Epon 828 sold by Shell Chemical Company. One of the principal reasons for using an epoxy resin rather than, for example, a phenolic resin as an impregnate for glass fiber filler is based upon the fact that epoxy resins have, in general, been found to readily adhere to glass fibers as compared to other resins, such as the phenolics.

Prior compositions comprising combinations of phenolic and epoxy resins have been used to form castings or molded articles, however, as far as is known, such compositions have not been used to form cellulose or paper-base laminates. This has probably been due, in part, to the fact that such compositions, in the absence of special considerations as taught by this invention, cannot be used to adequately saturate or impregnate paper, at least to the extent that is required for electrical grade synthetic laminates.

It has now been found that certain resinous compositions comprising combinations of a phenolic resole and an epoxy resin may be employed in the manufacture of paper-base laminates having markedly improved properties, particularly, insulation resistance, flexural strength and blister resistance. In brief, the invention comprises forming an impregnating or saturating composition comprising an epoxy resin, a phenolic resole having predominantly penetrating characteristics, and a vehicle, which includes water together with an organic solvent capable of dissolving both the epoxy and phenolic resin. This composition may be used to impregnate a paper filler in a one-coat step.

The epoxy resin used may be any one of numerous resins known to the art and commercially available. The epoxylated or polyglycidyl ether reaction product of a bisphenol with epichlorohydrin is suitable as is the polyglycidyl ether reaction product of epichlorohydrin with a permanently fusible phenolic aldehyde resin, which, as indicated hereinabove, is sometimes referred to as a novolak. Also, the analogous polyglycidyl ethers of polyfunctional alcohols, as are sold by Ciba Company, Inc., under their trademark, Araldite RD–2, may, likewise, be employed. The epoxy resin appears to enhance the flexural strength of the laminate by reason of the fact that it does not cure with cross-linking of molecules as is common with phenolic resin. Further, by way of theorizing as to the basis for results obtained by the present invention, epoxy resins do not cure with the evolution of water, whereby, at least during the initial drying stage of an impregnated filler, an appreciable amount of water of reaction would become entrapped thereby affecting insulation and blister resistance of the final laminate.

The phenolic resin component of the present system may include the condensation product of phenol, cresols, or xylenols and mixtures thereof with an aldehyde, such as formaldehyde. However, the predominant part of the phenolic resin should have penetrating characteristics as distinguished from coating characteristics. Thus, cellulose fibers, as are used in forming paper, are not solid, but rather are tubular and, hence, are capable of internally absorbing fluids. Accordingly, to achieve maximum properties in a laminate, it is necessary that the impregnating composition thoroughly penetrate into the internal portion of the tubular fibers rather than merely coat their external surface. Phenolic resins comprising primarily the condensation product of an aldehyde with a xylenol or a cresol are less inclined to penetrate tubular fibers as compared to phenol formaldehyde and, hence, such resins are normally used to provide an external resin coat for the fibers. Phenol formaldehyde, however, will readily enter into the tubular fiber rather than merely coat the outside and, accordingly, is frequently referred to as a penetrating resin. Ability to penetrate, as distinguished from merely coating, is understood to be a characteristic of those phenolic resins which are lower in molecular weight and are water soluble. Thus, the phenolic resin component of the present compositions should comprise a large percentage of phenol formaldehyde and, preferably, fifty percent or more, although the exact amount will, of course, vary to some extent depending on the type of filler used. A typical commercial resin containing a predominant amount of phenol formaldehyde is Bakelite 3913, which, in addition, usually contains some water. The phenolic component of the present compositions serves to stiffen the laminate and to complement the physical and electrical properties obtainable from the epoxy.

In order to impregnate the filter with the aforementioned resins, it is necessary to employ a special solvent system. One highly desirable solvent component is water which is important in order to achieve thorough saturation of the filler with the resin composition. The quantity of water used will vary depending upon the type and quality of filler. If an excess of water is used beyond that which is actually required, a paper filler, for example, will be degraded in that its tear strength will rapidly deteriorate. An average weight range for the water used is between about two to twenty percent based on the total weight of the composition, with a preferred quantity of water being about ten percent.

To dissolve the epoxy and phenolic resin, a single organic solvent for both may be used, if available, however, it has been found preferable to employ two different but compatible organic solvents. Excellent results have been obtained by using either one of the following solvent systems:

(1) Methyl ethyl ketone
    Tetrahydrofuran or dioxane
    Water (2) Isopropanol
    Methyl ethyl ketone or dioxane
    Water In forming the laminate, the saturating varnish is initially prepared containing, by weight, between about two to three parts of phenolic resin to one part of epoxy resin together with a catalyst, generally an amine. The cellulosic filler, usually paper, is passed through a bath of the varnish at a rate which will insure thorough penetration and coating of the fibers. Following impregnation, the filler is then passed through a drying oven where volatiles are substantially removed and the resin system partially cured. Normal production practice contemplates more or less a continuous operation in that the filler is supplied to the impregnating and drying stations from a large roll. After drying, the impregnated stock is cut into sheets of desired size, a plurality of the sheets being then assembled in a pile or build-up. The number of sheets used in the build-up will be determined primarily by the final thickness desired in the laminate. The build-up is inserted between the platens of a press and subjected to heat and pressure to cure the resin and consolidate the whole assembly into an integral, hard, board-like product. Press cures normally involve pressures of the order of 1000–1200 p.s.i., temperatures of between about 140° C.–180° C. for a period of approximately forty-five to ninety minutes, the time and temperature being inversely related.

Following are exemplary embodiments of the invention:

*Example 1*

Hurlbut 504 cotton rag .010 inch paper was saturated with the following varnish, the proportions cited being parts by weight.

Bakelite 3913 phenolic resole _____ 29.7
Epoxylated novolak (2–1 mole ratio of phenol to formaldehyde) _____ 8.7
Water _____ 6.9
Methyl ethyl ketone _____ 18.4
Tetrahydrofuran _____ 36.3

After impregnation, the paper was placed in an air circulation oven for thirteen minutes at a temperature of 122° C. Sufficient sheets were assembled in a stack so as to give a final laminate having a thickness of about .071 inch, the assembly placed in presses and subjected to 1200 p.s.i. for ninety minutes at 150° C. The resin content of the cured laminate was determined to be fifty-two percent by weight of the total weight. The following test data was determined from the sample:

| Property | ASTM No. | Results |
| --- | --- | --- |
| Water Absorption | D570-42 | 0.2%. |
| Flexural Strength | D790-49T | 26,000 p.s.i. (23° C.). |
| Power Factor | D150-47T | .029. |
| Insulation Resistance | D257-52T | Above $10^{12}$ ohms. |

*Example 2*

Buckeye BC–10 cotton linters .010 inch paper was saturated with the following varnish, the parts being by weight:

Epon 828 (Shell) _____ 15.0
Bakelite 3913 phenolic resole _____ 51.4
Dioxane _____ 15.0
Water _____ 7.0
Methyl ethyl ketone _____ 11.0
Ethylenediamine _____ 0.2

The impregnated paper was dried in an air circulation oven for seven minutes at 130° C. and a .062 inch laminate made by subjecting a plurality of impregnated dried sheets to 1200 p.s.i. for ninety minutes at 142° C. Properties were determined to be as follows, using the same ASTM test procedures specified in Example 1:

Property: Results
    Water absorption _____ 0.3%.
    Flexural strength _____ 23,000 p.s.i.
    Power factor _____ .031.
    Insulation resistance _____ Above $10^{12}$ ohms.

In determining the power factor, the laminate is immersed in water for a period of twenty-four hours at 23° C. before test. Insulation resistance is measured after subjecting the laminate to ninety percent relative humidity at 40° C. for a period of ninety-six hours.

Many of the higher grades of laminate currently available, for example, XXXP, have average flexural strengths of about 18,000 p.s.i. and an insulation resistance of between about 100,000–300,000 megohms. These properties may be compared to similar properties of laminates made in accordance with the present invention which have flexural strengths averaging about 25,000 p.s.i. and a minimum insulation resistance of about one million megohms.

For certain specialized applications, such as in the field of "printed circuits," laminates of the present type have, as an outer lamina, a layer of copper foil, portions of which are subsequently removed by a well-known process to leave a circuit of predetermined design. It is important that good adhesion is maintained between the copper foil and the underlying synthetic laminate, especially when parts of the foil are subjected to a high heat as may be encountered in soldering a lead or component terminal to the copper circuit. Many of the currently available copper clad laminates have been found to have poor adhesion when subjected to heat tests in that blistering beneath the copper layer occurs resulting in a delamination of the copper from the base laminate. It is, generally, understood that the thermosetting resin systems used in the formation of laminates are substantially cured in the press. However, it is also recognized that, while the resins have been cured for most practical use, all such thermosetting resins can usually undergo limited additional curing if subjected to temperatures which are higher than those employed in the press cure, which is the case in localized areas when soldering to a copper clad laminate. Normally, when phenolic resins cure, the reaction is one of condensation and involves the elimination of water. It is the elimination of water upon further curing which is believed to be the cause of blistering, the water formed making an attempt to escape from the laminate. The phenolic resins used in making the present laminates are believed to cure, at least partially, by reaction with the epoxy component of the resin system without the elimination of water, thereby substantially reducing the tendency for formation of blisters at the undersurface of the copper foil.

Copper clad laminates which may be formed, in accordance with the present invention, have been found to withstand 500° F. for sixty seconds without delamination of the copper foil. This property is to be compared to like properties of many commercially available copper clad laminates which are found to delaminate under the same test conditions within about ten seconds or less.

For purposes of improving the fabricating qualities of laminates made, for example, by the teachings of this invention, certain fatty acids may be employed as an addition to the present resin system as is disclosed and claimed in our application, S.N. 759,434, filed September 8, 1958.

Having described the invention and certain exemplary embodiments thereof, the same is only intended to be limited by the scope of the following claims.

We claim:

1. In a process for making a laminate which includes impregnating a cellulose fiber filler with a heat-curable resinous composition comprising: (1) a polyglycidyl ether of a polyhydroxyl compound from the class consisting of phenols and alcohols; (2) a phenolic aldehyde resin consisting predominantly of a substantially water-soluble resole condensation product of phenol and formaldehyde, the ratio by weight of phenolic resin to polyglycidyl ether being between about 2:1 to 3:1; and (3) a solvent which includes water to the extent of about two to twenty percent of the total weight of said composition; forming an assembly of superimposed impregnated sheets of said filler; and subjecting said assembly to heat and pressure; whereby the resin components are cured to an infusible state and the assembly is converted to a hard, board-like product.

2. In a process for making a laminate which includes impregnating a cellulose fiber filler with a heat-curable resinous composition comprising: (1) a polyglycidyl ether of a bisphenol; (2) a phenolic aldehyde resin containing at least fifty percent of a substantially water-soluble resole condensation product of phenol and formaldehyde, the ratio by weight of phenolic resin to polyglycidyl ether being between about 2:1 to 3:1, and (3) a solvent which includes water to the extent of about two to twenty percent of the total weight of said composition; forming an assembly of superimposed impregnated sheets of said filler; and subjecting said assembly to heat and pressure, whereby the resinous components are cured to an infusible state and the assembly is converted to a hard, board-like product.

3. In a process as described in claim 2 wherein the cellulose fiber filler is paper.

4. A board-like laminate composed of a plurality of cellulose fiber filler sheets bound as an integral unit by an infusible resin formed by subjecting to cure under heat and pressure an assembly of said filler sheets which have been impregnated with a resinous composition comprising: (1) a polyglycidyl ether of a polyhydroxyl compound from the class consisting of phenols and alcohols; (2) a phenolic aldehyde resin consisting predominantly of a substantially water-soluble resole condensation product of phenol and formaldehyde, the ratio by weight of phenolic resin to polyglycidyl ether being between about 2:1 to 3:1; and (3) a solvent which includes water to the extent of about two to twenty percent of the total weight of said composition.

5. A board-like laminate composed of a plurality of cellulose fiber filler sheets bound as an integral unit by an infusible resin formed by subjecting to cure under heat and pressure an assembly of said filler sheets which have been impregnated with a resinous composition comprising: (1) a polyglycidyl ether of a bisphenol; (2) a phenolic aldehyde resin consisting predominantly of a substantially water-soluble resole condensation product of phenol and formaldehyde, the ratio by weight of phenolic resin to polyglycidyl ether being between about 2:1 to 3:1; and (3) a solvent which includes water to the extent of about two to twenty percent of the total weight of said composition.

6. A laminate as described in claim 5 wherein the filler is paper.

References Cited in the file of this patent

UNITED STATES PATENTS

| 2,512,996 | Bixler | June 27, 1950 |
| 2,521,911 | Greenlee | Sept. 12, 1950 |
| 2,521,912 | Greenlee | Sept. 12, 1950 |
| 2,699,413 | Seagren et al. | Jan. 11, 1955 |
| 2,810,674 | Madden | Oct. 22, 1957 |
| 2,876,208 | Naps | Mar. 3, 1959 |

FOREIGN PATENTS

| 546,129 | Canada | Sept. 10, 1957 |